UNITED STATES PATENT OFFICE.

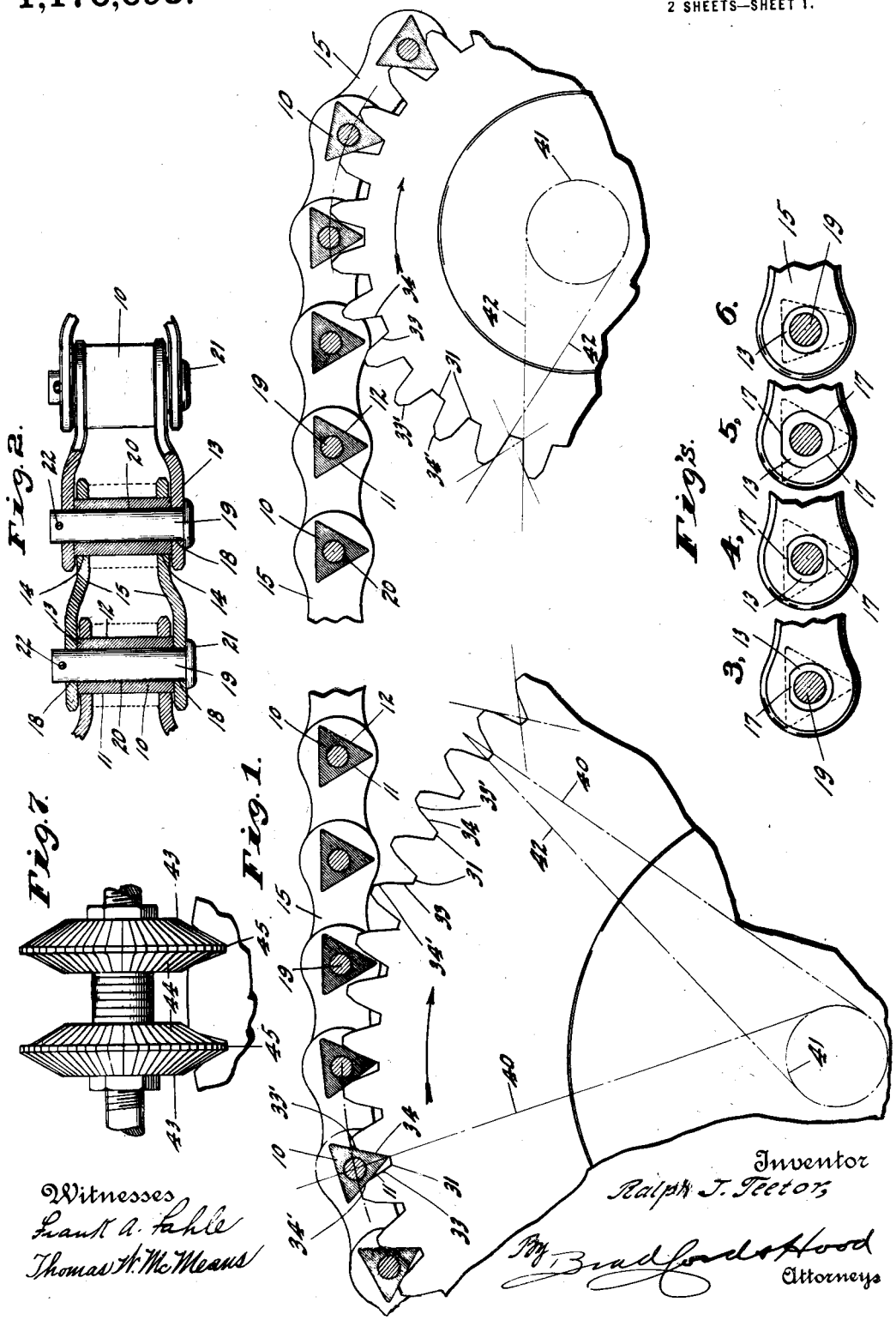

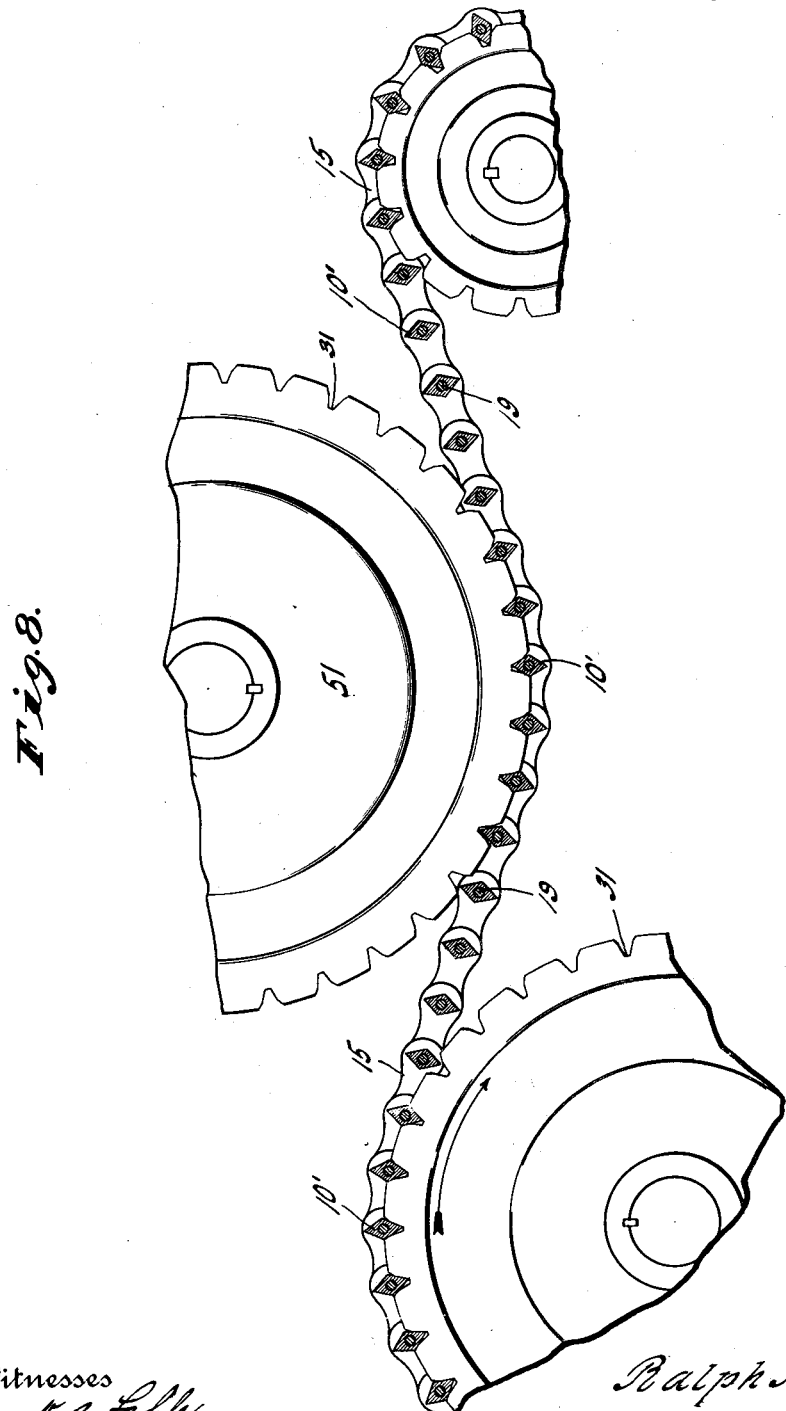

RALPH J. TEETOR, OF INDIANAPOLIS, INDIANA.

DRIVING-CHAIN AND COÖPERATING WHEEL.

1,176,693. Specification of Letters Patent. Patented Mar. 21, 1916.

Application filed October 7, 1909. Serial No. 521,549.

*To all whom it may concern:*

Be it known that I, RALPH J. TEETOR, a citizen of the United States, residing at Indianapolis, in the county of Marion and State of Indiana, have invented certain new and useful Improvements in Driving-Chains and Coöperating Wheels, of which the following is a specification.

The object of my invention is to produce, with a limited number of duplicate parts, a power transmitting chain belt, and a coöperating sprocket wheel, of such character that the structures may be readily and cheaply manufactured and of such character that, in use, the coöperative action between the wheel and chain will be of the "silent" type.

The accompanying drawings illustrate an embodiment of my invention.

Figure 1 is a longitudinal section of the chain and a side elevation of two coöperating sprocket wheels having a two-to-one ratio; Fig. 2 an axial sectional detail of several links of chain; Figs. 3, 4, 5 and 6, details showing different connections between cross bar and side links and different shapes of cross bars; Fig. 7 a pair of cutters capable of producing the teeth of my improved wheel, and Fig. 8 an elevation showing a modified form of chain and the use of same.

In the drawings, 10 indicates a cross bar having two working faces 11 and 12 which lie at an acute angle to each other. The exact angle is not especially material except that the bars of course must be uniform in any given chain, but, for commercial reasons I believe it probable that the angle between the two faces 11 and 12 should be 60° so that the cross bars may be produced from commercial bars having an equilateral triangular cross section, such bars being readily producible by ordinary rolling processes and being readily procurable in the open market. Each of these bars is reduced at each end to form a hub portion 13 adapted to be pressed firmly into correspondingly formed perforations 14 formed in one end of the side bars 15 which are of the ordinary form with their opposite ends offset by an amount substantially equal to the thickness of the material from which the side bars are made. The hubs 13 may be circular in cross section if the perforations 14 are of such size that the side bars will be sufficiently firmly attached to the cross bar to prevent relative rotation of the cross bar in the perforations. In practice however I deem it desirable to flatten each hub 13 at one or more points 17 and correspondingly shape the perforations 14 so as to prevent any possibility of rotation of the cross bar in the perforations. For commercial reasons it is probably desirable to form the hubs 13 in the manner indicated in Fig. 5 where the radius of the hub 13 exceeds the radius of a circle inscribed in the triangular cross section of the cross bar.

At their opposite ends links 15 are perforated by perforations 18 adapted to receive a pivot pin 19 which passes pivotally through an axial perforation 20 in the cross bar 10. The pin 19 may be held in place axially by any suitable means, as for instance a head 21 at one end and a withdrawable cotter pin 22 at the opposite end. Pin 19 should preferably have a non rotative connection with the side bars 15 to prevent wear of the side bars. It will be noted from the above that each cross bar 10 is rigidly secured to a pair of side bars and is then pivoted upon a pin which lies in the axis of the cross bar of the next link. In order to make the chain reversible, (*i. e.* capable of running in either direction), the cross bar should preferably be so placed that a line drawn through the axis of the cross bar and the apex between the working surfaces 11 and 12 will lie at right angles to a line drawn between the centers of the two sets of perforations 14 and 18.

This chain requires a coöperative wheel having teeth especially formed to receive the cross bars in such manner that they will set between the teeth without noise and each of these wheels is therefore provided with a series of notches 31 each of which, in order that the movement may be in either direction, is provided at its base with two oppositely inclined surfaces 33 and 34 and at its crown with two oppositely inclined surfaces 33' and 34', the surface 33' subjoining the surface 34 and the surface 34' subjoining the surface 33. Surfaces 33' and 33, lie at an angle to each other equal to the angle between the surfaces 11 and 12 of the cross bars 10 and the surfaces 34' and 34 lie at a similar angle to each other. The angle of movement of the cross bar relative to any notch, due to a reversal of the chain on the wheel, is the angle between surfaces 33 and 11 and this angle is equal to the angle of articulation of the chain on any given wheel, i. e. the angle between the two lines drawn between the centers of two adjacent links in full engagement with the wheel. Of course this angle of articulation varies inversely with the pitch radius of any wheel, and is equal to the angle between the bisector of the angle between surfaces 33 and 33' and the bisector of the angle between surfaces 34 and 34'. By this formation of the wheel the driving chain may be placed upon the wheels in either direction and so as to run in either direction although in practice I believe it to be desirable for the smaller wheel to engage the cross bars with their surfaces 34' and 34.

It will be seen from the above that, with the apex between surfaces 11 and 12 of the cross bars lying in a line at right angles to the axial line of the side bars the bisector 40 of the angle between surfaces 34 and 34' will be tangent to a circle 41 at the center of the wheel having a diameter equal to the pitch of the chain and that this will be true no matter what the pitch diameter of the wheel may be; and similarly the bisector 42 of the angle between the surfaces 33 and 33' will also be tangent to the same circle 41 but substantially diametrically opposite from the point of tangency of the bisector 40.

From the above it will be seen that I am able to produce, with a single pair of cutters, properly formed teeth upon wheels of all pitch diameters and that the same cutters are available for producing the teeth of all pitches merely by properly adjusting the cutters axially in accordance with the pitch desired. For the purpose of clearness I have shown diagrammatically, in Fig. 7 such a pair of cutters each cutter having two cutting faces 43 and 44 which lie at an angle to each other equal to the angle between the working faces 11 and 12 of the cross bars on the chain. The planes of these cutters are parallel and a distance apart equal to the pitch desired so that, when the cutters are simultaneously brought into engagement with the wheel to produce the notches already described, one cutter will produce a notch having the surfaces 33 and 33' while the other cutter will produce a notch having the surfaces 34 and 34', the axes of the cutters lying at a right angle to a radius of the wheel bisecting the distance between the notches. The advancement of the wheel relative to the cutters through the pitch distance and repetition of the action already described will cause one cutter to produce a new notch having the surfaces 34 and 34' and the other cutter will operate in the previously formed notch having surfaces 34 and 34' to produce the surfaces 33 and 33'. In order to automatically clear the bottoms of the notches thus formed, each cutter at its tip or edge is provided with a portion 45.

I do not herein claim the method of and apparatus for producing the teeth herein disclosed, but the same will form the subject-matter of a co-pending application which will be filed in due course.

In the drawings I have shown the notches of the wheels as formed entirely inside of the pitch line with the crowns of the teeth thus formed substantially coincident with the pitch line but it will be readily understood that the crowns may be extended beyond the pitch line or stopped short of the pitch line but beyond the junction of the surfaces 33 and 34' or 34 and 33', without departing from the spirit of my invention.

It will be understood that the distance between the cross-bar-receiving notches is relatively so great (see Fig. 7) that it becomes possible to produce between any pair of notches an additional notch, as indicated in Fig. 1, so that it becomes possible to provide an uneven number of notches in any given wheel and thus increase the effective wear or life of the wheel because there will be a progressive reaction between the cross bars and the notches.

In many instances it is very desirable to be able to drive a sprocket wheel the axis of which lies outside of the chain but heretofore considerable difficulty has been experienced in making such an arrangement because of the difficulty of producing a proper engagement between the backside of the chain and the additional wheel. With my present form of chain, by a slight modification, this difficulty is entirely obviated and in Fig. 8 I have illustrated such a modification. In this form of chain or crossbar 10' has a diamond shaped cross section which, for the reasons already pointed out in the previous part of the specification, should have two sets of working faces the faces of each pair lying at approximately 60° from each other so that the back side of the chain can be readily brought into coaction with a wheel 51 the axis of which is entirely outside of the bight of the chain. It will be immediately apparent that the action of the chain upon wheel 51 will be exactly the same as its action upon the wheels which are arranged within the bight of the chain and that the notches in wheel 51 will have the same characteristics as the notches in other wheels. While I have shown the diamond shaped section of the cross bar as having a 60° angle between its pair of working faces yet it is to be understood that a considerable variation from this angle may be had without departing from my invention, the change in the angle resulting merely in a corresponding change in the angle between the pairs of working faces of the notches of the wheels.

I claim as my invention:

1. A drive chain comprising a plurality of links each consisting of a polygonal cross bar and a pair of side bars rigidly connected thereto, said cross bar having a pair of working faces lying at an acute angle to each other, and each link pivotally connected to the adjacent link on an axis between the working faces of the cross bar of the adjacent link, any two links being articulatable toward the apex of the angle of the two working faces of the cross bar, and a coöperating wheel having notches for receiving said cross-bars, each notch having two pairs of working faces lying at an angle to each other equal to the angle between the working faces of the chain, and the bisectors of the angles between the surfaces of each pair lying at an angle to each other equal to the angle of articulation of the links on the wheel.

2. A drive chain comprising a plurality of links each consisting of a polygonal cross bar and a pair of side bars rigidly connected thereto, said cross bar having a pair of working faces lying at an acute angle to each other, and a pin carried by the pair of side bars of each link and journaled in the cross bar of an adjacent link between the working faces of said cross bar, thus forming pivotal connection between said two links, any two links being articulatable toward the apex of the angle of the two working faces of a cross bar and a coöperating wheel having notches for receiving said cross-bars, each notch having two pairs of working faces lying at an angle to each other equal to the angle between the working faces of the chain, and the bisectors of the angles between the surfaces of each pair lying at an angle to each other equal to the angle of articulation of the links on the wheel.

In witness whereof, I have hereunto set my hand and seal at Indianapolis, Indiana, this 1st day of October, A. D. one thousand nine hundred and nine.

RALPH J. TEETOR. [L. S.]

Witnesses:
MARGHERITA W. TEETOR,
THOMAS W. MCMEANS.